(12) United States Patent
Wolf et al.

(10) Patent No.: US 12,460,918 B2
(45) Date of Patent: Nov. 4, 2025

(54) CHAIN SENSOR DEVICE AND METHOD FOR DETERMINING WEAR

(71) Applicant: iwis antriebssysteme GmbH & Co. KG, Munich (DE)

(72) Inventors: Thomas Wolf, Erdweg (DE); Florian Wimmer, Munich (DE)

(*) Notice: Subject to any disclaimer, the term of this patent is extended or adjusted under 35 U.S.C. 154(b) by 220 days.

(21) Appl. No.: 17/705,669

(22) Filed: Mar. 28, 2022

(65) Prior Publication Data

US 2022/0307817 A1 Sep. 29, 2022

(30) Foreign Application Priority Data

Mar. 29, 2021 (DE) .................. 10 2021 107 899.7

(51) Int. Cl.
*G01B 7/04* (2006.01)
*G01B 11/04* (2006.01)
*G01N 3/56* (2006.01)

(52) U.S. Cl.
CPC ............ *G01B 11/043* (2013.01); *G01B 7/042* (2013.01); *G01N 3/56* (2013.01)

(58) Field of Classification Search
CPC ........ G01B 11/043; G01B 7/042; G01B 7/24; G01B 11/16; G01B 21/042; G01B 5/0025; G01B 21/02; G01B 7/02; G01N 3/56; F16G 13/06
USPC ......................... 356/634, 429, 383
See application file for complete search history.

(56) References Cited

U.S. PATENT DOCUMENTS

| | | | | |
|---|---|---|---|---|
| 5,291,131 A | * | 3/1994 | Suzuki ................. | G01B 11/043 324/206 |
| 2004/0226805 A1 | | 11/2004 | Lodge | |
| 2011/0093218 A1 | * | 4/2011 | Vozner ................. | G01B 11/043 356/429 |
| 2014/0102212 A1 | * | 4/2014 | Urbanzyk .............. | G01B 21/06 73/828 |
| 2015/0226582 A1 | * | 8/2015 | Siraky .................. | G01D 5/2013 324/207.15 |
| 2016/0010977 A1 | * | 1/2016 | Frost ...................... | B65G 43/02 702/34 |
| 2016/0116356 A1 | * | 4/2016 | Goldstein ............... | G01L 3/247 73/1.15 |
| 2017/0030815 A1 | * | 2/2017 | Frost ...................... | B65G 43/02 |

(Continued)

FOREIGN PATENT DOCUMENTS

JP 2017019616 1/2017

OTHER PUBLICATIONS

Textile machinery and accessories—Pitches of knitting machines (ISO 8188:2007); Text in German and English (Feb. 2009).
Roller Chains—European Type—Part 1—DIN 8187-1:Mar. 1996.

*Primary Examiner* — Isiaka O Akanbi
(74) *Attorney, Agent, or Firm* — JMB DAVIS BEN-DAVID

(57) ABSTRACT

The invention relates to a method for setting up two sensor systems for monitoring the state of wear of a chain, which method comprises the steps: first positioning of the first sensor system relative to a calibration object, first positioning of the second sensor system relative to the calibration object, carrying out a first signal detection using the first sensor system, carrying out a first signal detection using the second sensor system, wherein the first signal detection using the first sensor system takes place at the same time as the first signal detection of the second sensor system.

21 Claims, 7 Drawing Sheets

(56) References Cited

U.S. PATENT DOCUMENTS

2019/0062067 A1\*  2/2019  Kreisfeld ............. G01B 11/043
2019/0368862 A1\* 12/2019  Murray ................. B65G 15/30
2022/0153555 A1\*  5/2022  Hirai ..................... B65G 23/44

\* cited by examiner

CHAIN SENSOR DEVICE AND METHOD FOR DETERMINING WEAR

CROSS-REFERENCE TO RELATED APPLICATIONS

Benefit is claimed to German patent application No. 10 2021 107 899.7, filed on Mar. 29, 2021, the contents of which are incorporated by reference herein in their entirety.

FIELD

The invention relates to a method for setting up two sensor systems for monitoring the state of wear of a chain, which comprises the steps: first positioning of the first sensor system relative to a calibration object, first positioning of the second sensor system relative to the calibration object, carrying out a first signal detection using the first sensor system, carrying out a first signal detection using the second sensor system, wherein the first signal detection using the first sensor system takes place at the same time as the first signal detection of the second sensor system.

BACKGROUND

Chain drives are used in a variety of industrial applications for drive or transport purposes. Multiple strands of chain are often used. In addition to a mostly endlessly circulating chain, a complete chain drive includes several sprockets that are used to deflect the chain, as well as drive or transport elements that are connected to the chain and are actuated by the chain. A chain is subject to wear during operation as a result of the abrasion of parts in the chain joint that move relative to one another. Other factors, such as elongation at chain run-in, stretching, bearing play and bearing wear, can also lead to elongation of the chain and ultimately to failure of the drive unit. Other factors influencing the wear of a chain are the forces that act on the chain and loads, or external influences determined by the environment. Due to the complexity of these relationships, it is not possible to predict the wear of the chain and thus a possible disruption in the operational process or even the failure of the drive unit. Since the wear of a drive chain or its elongation cannot be avoided and cannot be reliably predetermined, a chain drive must be continuously monitored using a measuring system in order to be able to carry out timely inspections to adjust the synchronized processes and replace defective chains.

Conventional measuring systems require for an accurate measurement of the chain elongation a drive with a constant speed and react with measurement errors to irregularities in the drive system, for example a relative slippage between the drive wheel and the drive chain or the wear of the sprockets.

Furthermore, it is known from the prior art to determine the wear of a drive chain by measuring the force, the path or the angle of rotation of chain tensioners or by means of two angle of rotation sensors on the drive wheel and on the load wheel. However, a chain tensioner is not needed everywhere, and rotation angle sensors cannot be used everywhere either. In addition, these are then influenced by wear or chain elongation. However, such methods must be precisely matched to the specific method, since the measurement in these cases depends on the total chain length and also on the wear of the sprockets. The adjustment is very complex and error-prone. Therefore, these methods are not generically applicable. Other known measuring systems have at least two optical or inductive sensors which are at a defined distance from one another and continuously measure the length of the chain during operation.

Such a measuring system is presented, for example, in U.S. Pat. No. 5,291,131. In this method, two markings spaced apart in the longitudinal direction of the chain are provided on the drive chain, the position of the markings being detected during operation by two inductive or optical sensors, which are also arranged at a distance from one another. The rotational speed of the chain and the chain elongation in the chain segment between the spaced markings can be determined from the measured values of the two sensors via a connected data acquisition system.

Setting the defined distance between the two sensors is usually a lengthy process that takes place in several passes. For optimizing the manufacturing process, a reproducible method is required to precisely determine the optimal distances between the sensors. The positions of the sensors are subject to fluctuations due to the sensor geometry, the influence of different chain geometries and the mechanical and metrological tolerances.

The object of the invention is therefore to provide a method for setting up two sensor systems for monitoring the state of wear of a chain, with which the positions and distances between the sensor systems can be set and determined reliably, precisely and quickly. It is also an object of the invention to provide a sensor device with which error states of the monitored chain can be detected reliably and quickly, the elongation of each individual chain segment is determined, the monitored chain does not have to have a minimum speed, and the elongation of the chain can also be statistically detected over a longer period of time.

The object is achieved by means of the method according to the invention for setting up two sensor systems for monitoring the state of wear of a chain. Advantageous embodiments of the invention are set out in the dependent claims.

SUMMARY

The method according to the invention for setting up two sensor systems for monitoring the state of wear of a chain comprises four steps. In the first step, the first sensor system is first positioned relative to a calibration object. In the second step, the second sensor system is first positioned relative to a calibration object. Both sensor systems are thus aligned and positioned using a calibration object in such a way that they are at a defined distance from one another. The distance between the two sensor systems depends on the pitch of the chain that is to be monitored using the sensor systems. Different distances between the sensor systems are therefore necessary for different pitches of different chains to be monitored. In the third step, a first signal detection is carried out using the first sensor system. In the fourth step, a first signal detection is carried out using the second sensor system. According to the invention, the first signal detections of both sensor systems take place simultaneously with regard to whether the two sensor systems detect a chain component at the same time. By using a calibration object, the method according to the invention provides a reproducible distance between the two sensor systems. In a development of the invention, the two sensor systems form a sensor device.

In a development of the invention, the first positioning of the first sensor system and the first positioning of the second sensor system take place at the same time. The first and second sensor systems are usually arranged in one component, for example a housing. The component is positioned with the sensor systems installed in it.

In a further embodiment of the invention, the first and/or the second sensor system is positioned a second time relative to the calibration object, the second positioning being different from the first positioning, and/or a second signal detection takes place with the first and/or second sensor system. The method according to the invention is advantageously carried out several times in succession at different positions on the calibration object in order to detect and compensate for any fault states due to different chain geometries over the chain length and due to mechanical and metrological tolerances.

In a further embodiment of the invention, the second positioning of the first and the second sensor system and/or the second signal detection by the first and the second sensor system takes place at the same time. The first and second sensor systems are usually arranged in one component, for example a housing. The component is positioned with the sensor systems installed in it. According to the invention, the first signal detections of both sensor systems take place simultaneously with regard to whether the two sensor systems detect a chain component at the same time.

In a further embodiment of the invention, the calibration object is designed in two parts. In a development of the invention, the first part of the calibration object is a chain. In particular, the chain is of the type of chain to be monitored by the sensor system.

In a further embodiment of the invention, the second part of the calibration object is an element with the aid of which chain components can be positioned in relation to one another. Depending on the chain components to be positioned, the second part of the calibration object has elements with which the chain components can be connected or the position of which can be clearly identified. These elements can act, for example, mechanically (e.g. grooves) or optically (e.g. by means of image recognition).

In a further embodiment of the invention, the method for setting up two sensor systems for monitoring the state of wear of a chain takes place based on the chain type for which the sensor is to be used. The individual chain types differ in various dimensions, e.g. the pitch. The method according to the invention must therefore be matched to each type of chain to be monitored.

In a further embodiment of the invention, the chain type is a standard chain. A standard chain has standard components with standard dimensions according to DIN 8187 or DIN 8188.

In a development of the invention, the chain type is a standard chain according to British Standard (DIN 8188) or ANSI Standard (DIN 8187). The individual dimensions of the chain components are partly different in the British Standard chain and in the ANSI Standard. The roller diameters, for example, often differ.

In a further embodiment of the invention, the method for setting up two sensor systems for monitoring the state of wear of a chain takes place based on the pitch of the chain for which the sensor is intended. The distance between the two sensor systems is usually an integer multiple of the pitch of the chain to be monitored in order to simultaneously detect the position of a first chain component using the first sensor system and the position of a second chain component using the second sensor system.

In a development of the invention, the pitch of the chain corresponds to 12.700 mm, 15.875 mm, 19.050 mm, 25.400 mm, 31.750 mm, 38.100 mm, 44.450 mm or 50.800 mm.

The pitches of the standard chains according to British Standard (DIN 8188) or ANSI Standard (DIN 8187) are the same.

In a further embodiment of the invention, the first sensor system and/or the second sensor system are suitable for detecting the position of a chain component. The sensor systems are at a defined distance from one another, which corresponds to the pitch or an integer multiple of the pitch of the chain. The distance between the two sensors is a parameter for calculating the length value of the chain. The length value, like the distance between the chain components, is continuously and simultaneously determined.

In a further embodiment of the invention, the first and/or the second sensor system are suitable for detecting the signals of a chain component, in order to determine the position of the chain component over a path length range of the chain for which the sensor (the sensor system) is provided. The sensor systems are constructed in such a way that the position of the chain component is determined over a length range. The chain components therefore cover a distance in the detection range of the sensors, within which the position of the chain components is determined.

In a further embodiment of the invention, the path length range is greater than or equal to ½ the pitch of the chain, preferably greater than or equal to ¾ the pitch of the chain and particularly preferably greater than or equal to the pitch of the chain for which the sensor (the sensor system) is provided. The segments provide a complete coverage of at least those parts of the chain that are accessible to the chain sensor device for detecting the position. The length or number of segments depends on the length of the chain to be monitored.

In an optional embodiment of the invention, the first and/or the second sensor of the sensor device detect the measured values for determining the position of the chain components independently of the speed and/or the position of the chain to be monitored. In a further optional embodiment, the first and/or the second sensor detect the measured values for determining the position of the chain components when the chain speed is 0. In a further embodiment of the invention, the measured values for determining the position of a chain component are continuously detected and the position of the chain component is continuously determined from these measured values.

In an optional development of the invention, the first and/or the second sensor simultaneously detect the measured values for determining the position of a chain component over the path length range of the chain.

In a development of the invention, the sensor device simultaneously detects the measured values from the first and/or the second sensor over a length range of the chain. The length range of the chain extends in the direction of movement of the chain.

In a further embodiment of the invention, the length range is greater than or equal to half the length of a chain link, preferably greater than or equal to ¾ the length of a chain link and particularly preferably greater than the length of a chain link. The length of a chain link results from the defined standard according to a standard chain according to British Standard (DIN 8188) or ANSI Standard (DIN 8187).

In a further embodiment according to the invention, the first and/or the second sensor have at least two sensor elements forming the first and/or the second sensor. These are the primary coil and the secondary coils of the differential transformer or, for example, two or more photodiodes of a CCD chip, which are arranged along the direction of chain movement. The distance between the at least two sensor elements is limited to a length of less than twice a chain link of the chain to be monitored. The length of a chain link results from the defined standard according to a standard chain according to British Standard (DIN 8188) or ANSI Standard (DIN 8187).

The object is also achieved by means of the sensor device for determining state of wears of a chain. Additional advantageous embodiments of the invention are set out in the dependent claims.

The sensor device according to the invention for determining state of wears of a chain has a first sensor system and a second sensor system. According to the invention, the sensor device is set up for a standard chain and/or a standard pitch. A standard chain has standard components with standard dimensions according to DIN 8187 or DIN 8188.

In another embodiment of the invention, the chain type is a British Standard or ANSI Standard chain. The individual dimensions of the chain components are partly different in the British Standard chain and in the ANSI Standard. The roller diameters, for example, often differ from each other.

In a development of the invention, the pitch of the chain corresponds to 12.700 mm, 15.875 mm, 19.050 mm, 25.400 mm, 31.750 mm, 38.100 mm, 44.450 mm or 50.800 mm. The pitches of the standard chains according to British Standard (DIN 8188) or ANSI Standard (DIN 8187) are the same.

In an advantageous embodiment of the invention, the first sensor system is suitable for determining the position of a first chain component exclusively from the measured values detected by the first sensor system and/or the second sensor system is suitable for determining the position of a second chain component exclusively from the measured values detected by the second sensor system. The distance between the two chain components is determined from the position.

In a development of the invention, the sensor device is suitable for simultaneously detecting the measured values for determining the position of the first chain component and the position of the second chain component. The distance between the chain components is also determined simultaneously. In addition, the first and second detection and the determination of the distance between the chain components advantageously take place continuously. Therefore, fault states of the monitored chain can be detected quickly and reliably, and the elongation of the chain can also be detected statistically over a longer period of time.

In an advantageous embodiment of the invention, the first sensor and/or the second sensor are suitable for detecting the measured values for determining the position of the first or second chain component over a path length range of the chain. The sensor systems are constructed in such a way that the position of the chain component is determined over a length range. The chain components therefore cover a distance in the detection range of the sensors, within which the position of the chain components is determined.

In a further embodiment of the invention, the path length range is greater than or equal to ½ segment length. The segments provide a complete coverage of at least those parts of the chain that are accessible to the chain sensor device for detecting the position. The length or number of segments depends on the length of the chain to be monitored.

In a further embodiment of the invention, the segment length corresponds to the distance between the first chain component and the directly adjacent chain component. In the ideal case, the number of segments corresponds to the number of chain links in the chain to be monitored, so that each individual chain link is monitored with regard to its physical characteristics.

In an optional embodiment of the invention, the first and/or the second sensor of the sensor device detect the measured values for determining the position of the chain components independently of the speed and/or the position of the chain to be monitored. In an optional embodiment, the first and/or the second sensor are suitable for detecting the measured values for determining the position of the chain components when the chain speed is 0. In further embodiments of the invention, the measured values for determining the position of a chain component can be acquired at any time.

In an optional development of the invention, the first and/or the second sensor simultaneously detect the measured values for determining the position of a chain component over the path length range of the chain.

In a development of the invention, the sensor device is suitable and provided for simultaneously detecting the measured values from the first and/or the second sensor over a length range of the chain. The length range of the chain extends in the direction of movement of the chain.

In a further embodiment of the invention, the length range is greater than or equal to half the length of a chain link, preferably greater than or equal to ¾ of the length of a chain link and particularly preferably greater than the length of a chain link. The length of a chain link results from the defined standard according to a standard chain according to British Standard (DIN 8188) or ANSI Standard (DIN 8187).

In a further embodiment according to the invention, the first and/or the second sensor have at least two sensor elements forming the first and/or the second sensor. These are the primary coil and the secondary coils of the differential transformer or, for example, two or more photodiodes of a CCD chip, which are arranged along the direction of chain movement. The distance between the at least two sensor elements is limited to a length of less than twice a chain link of the chain to be monitored. The length of a chain link results from the defined standard according to a standard chain according to British Standard (DIN 8188) or ANSI Standard (DIN 8187).

BRIEF DESCRIPTION OF THE DRAWINGS

Exemplary embodiments of the method according to the invention for setting up two sensor systems for monitoring the state of wear of a chain and of the sensor device according to the invention are shown in a schematically simplified way in the drawings and are explained in more detail in the following description.

In the drawings.

DETAILED DESCRIPTION

Figure 1:
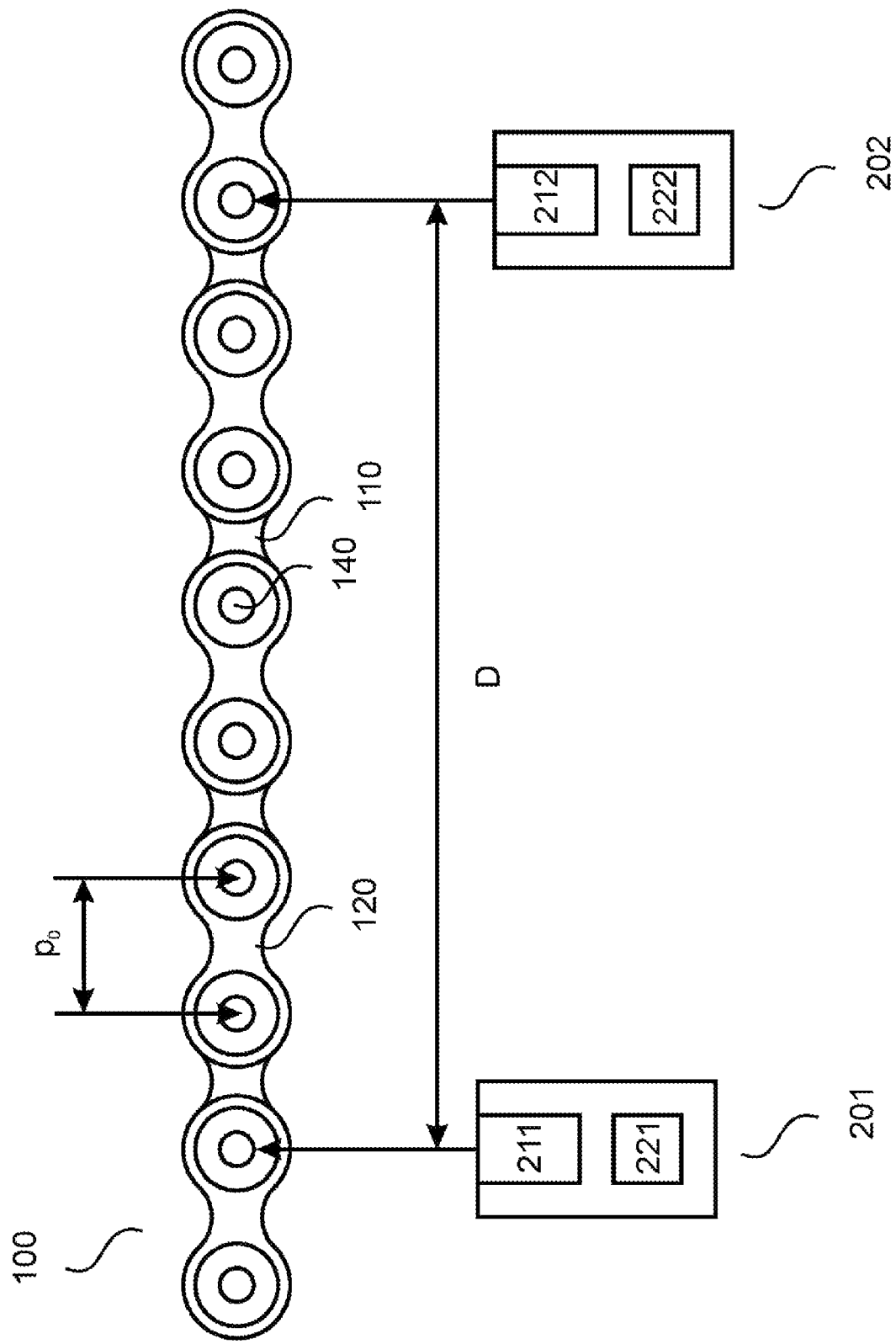
FIG. 1 shows a sensor device according to the invention

FIG. 1 shows the sensor device 200 according to the invention for determining the elongation of segments of a chain 100. In this and the following exemplary embodiments, the chain 100 to be monitored is designed as a one-piece roller chain and has alternating inner 110 and outer side parts 120 which are connected to one another by chain link pins 140 guided in chain bushings 130. When the chain 100 is new, the chain pins 140 are at a distance p0 from one another.

The length L0 of the chain 100 in new condition between the sensors 201, 202 is an integer multiple of the distance p0 between two adjacent chain pins 140 (L0=n*p0). Each sensor system 201, 202 has a respective sensor 211, 212, which is designed as a differential transformer in this and the following exemplary embodiments. In addition, each sensor system 201, 202 has a control 221, 222. The sensor systems 201, 202 together with the electrical connections are arranged in a housing (not shown) for protection against dirt.

To determine the elongation of chain 100 during operation, the sensor device 200 is positioned perpendicular to the joint axis of the chain 100 to be monitored in such a way that when the chain 100 is new, the distance D between sensor systems 201, 202 corresponds to an integer multiple of distances p0 between two adjacent chain pins 140 of the chain 100 to be monitored. Method 1 according to the invention for setting up two sensor systems 201, 202 is carried out for performing the precise calibration of the positioning of the sensor systems 201, 202 at the stated correct distance D from one another (see FIGS. 5, 6).

For this purpose, a first positioning 2 of the first sensor system 201 and a first positioning 3 of the second sensor system 202 in relation to the calibration object 400 are performed. A first signal detection is then carried out using the first sensor system 201 4, and at the same time a first signal detection 5 using the second sensor system 202 takes place. The method according to the invention provides a reproducible distance D between the sensor systems 201, 202.

The sensors 211, 212 are composed of a primary coil and two secondary coils and therefore have three sensor elements. Each of the differential transformers 211, 212 is thus suitable for simultaneously recording measured values over a length range of the chain 100 to be monitored. The length of the length range in the direction of the chain movement is based on the length p, p0 of a chain link of the chain 100 to be monitored and equals p0 in this exemplary embodiment. The detection of the measured values by the two differential transformers 211, 212 also takes place simultaneously.

Figure 2A:
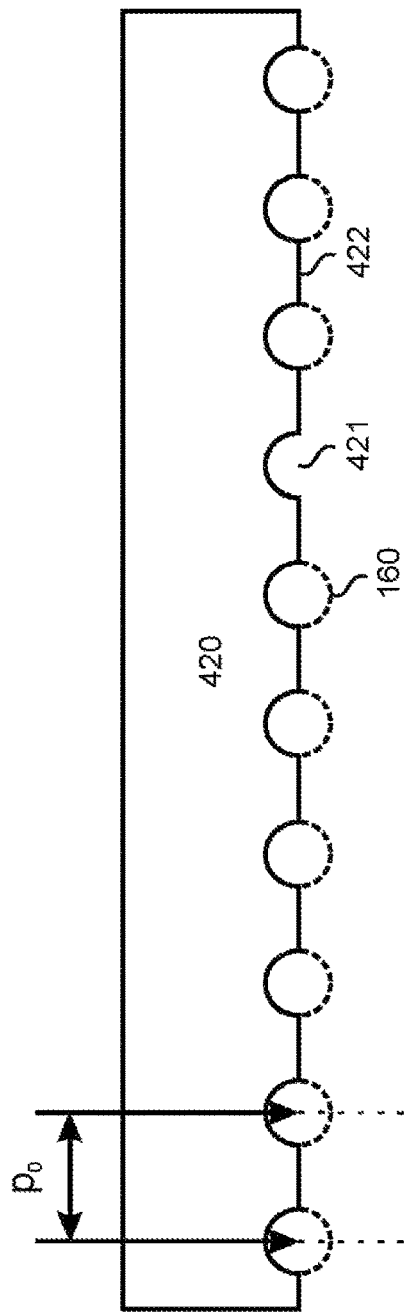
FIG. 2a is a side view of the first part of the calibration object according to the invention
Figure 2B:
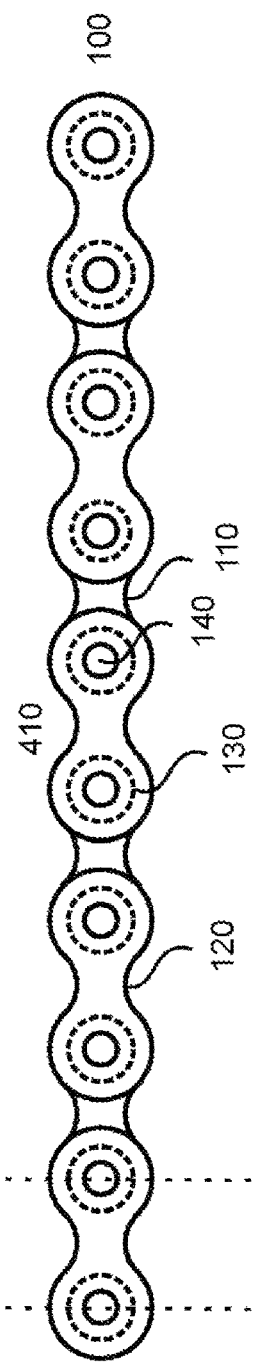
FIG. 2b is a side view of the second part of the calibration object according to the invention
Figure 2C:
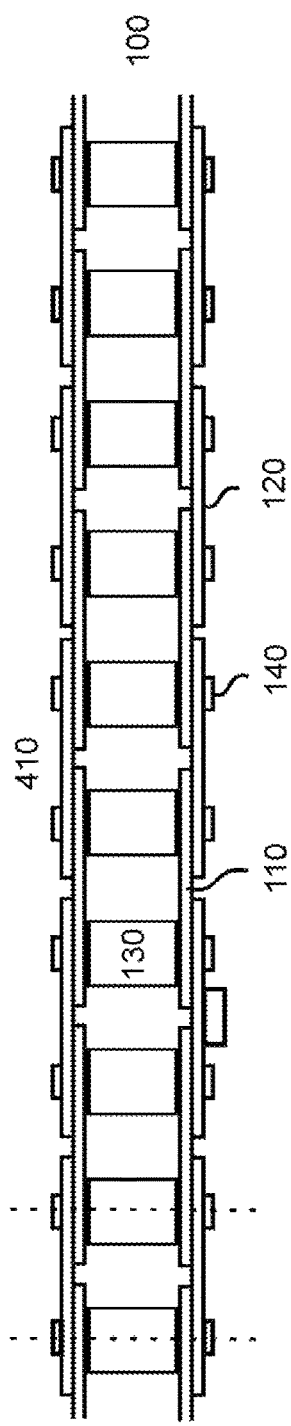
FIG. 2c is a plan view of the first part of the calibration object according to the invention
Figure 3:
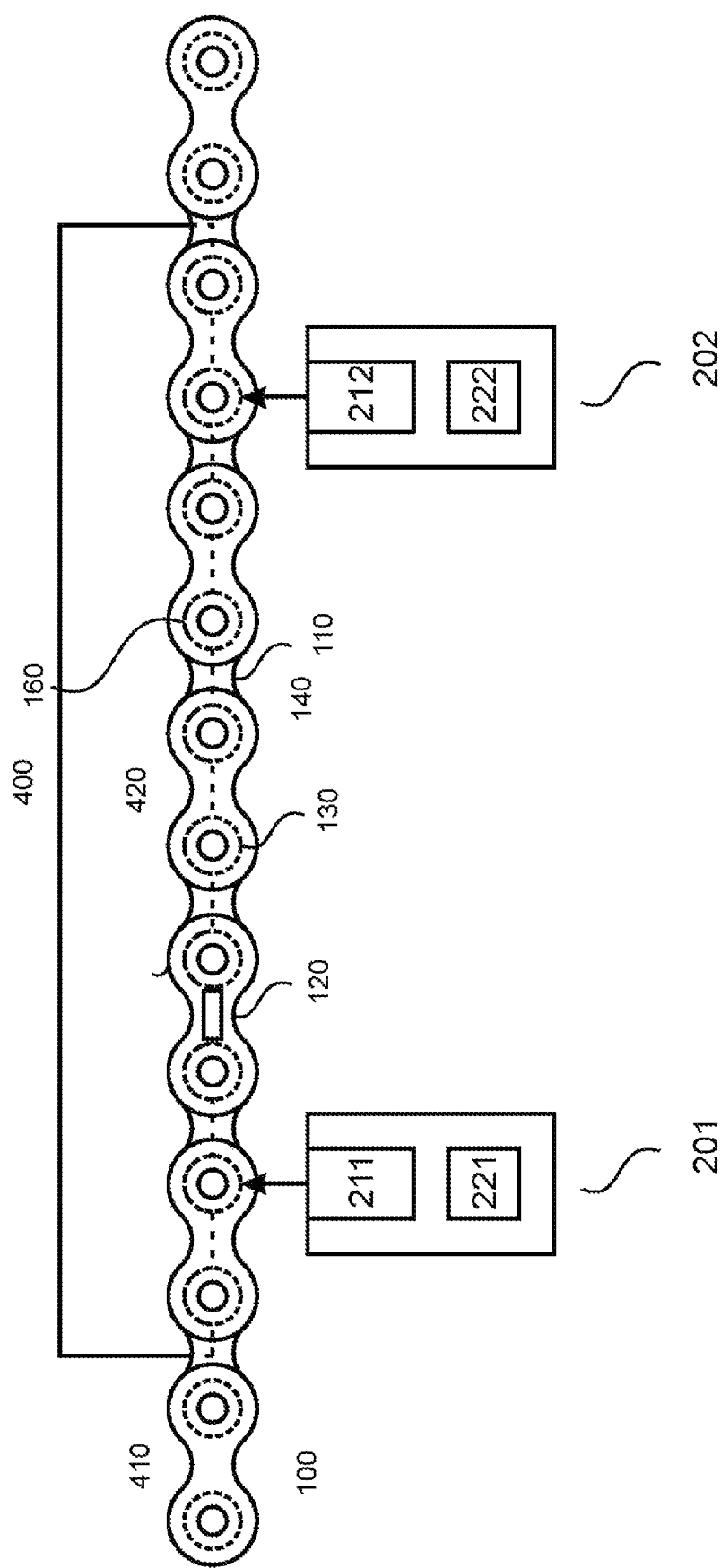
FIG. 3 shows a calibration object according to the invention arranged ready for use

The calibration object 400, which is used in the method 1 according to the invention, is shown in FIGS. 2 and 3. The calibration object 400 has two parts 410, 420: the first part 410 is the actual chain 100 to be monitored (FIG. 2b, c) or a chain section of a chain type of the chain 100 to be monitored. The chain 100 is a one-piece sleeve-type chain as described in FIG. 1. Alternatively, a roller chain can also be used. Such a chain 100 to be monitored is a standard chain according to ANSI Standard of the American type (DIN 8187) or according to British Standard (BS, DIN 8188). The chains according to these standards do not differ in the respective pitches p0. The chains according to ANSI Standard or British Standard differ in other dimensions (see FIG. 7), for example in the length of the chain pins.

The second part of the calibration object 400 is a template 420 (FIG. 2a) which has recesses 421 and serrations 422. The recesses 421 in the form of a semicircle or a segment of a circle have a center distance from one another which corresponds to the pitch p0 of the chain type whose elongation ΔL is to be monitored by the sensor device 200. The diameter of the recesses 421 also corresponds to the diameter of the chain bushings d of the chain type whose elongation ΔL is to be monitored with the sensor device 200.

The chain 100 for carrying out the method 1 according to the invention for setting up two sensor systems 201, 202 is arranged ready for use (FIG. 3) on the template 420 in such a way that the chain bushings 130 are arranged in the recesses 421. The sensor systems 201, 202 are then positioned in such a way that the distance D between the sensor systems 201, 202 corresponds exactly to an integer multiple of the distances p0 between two adjacent chain pins 140 of the chain 100 to be monitored. In the case of a roller chain, the rollers are positioned in the template 420 and the corresponding roller dimensions for the template 420 are used.

Figure 7:
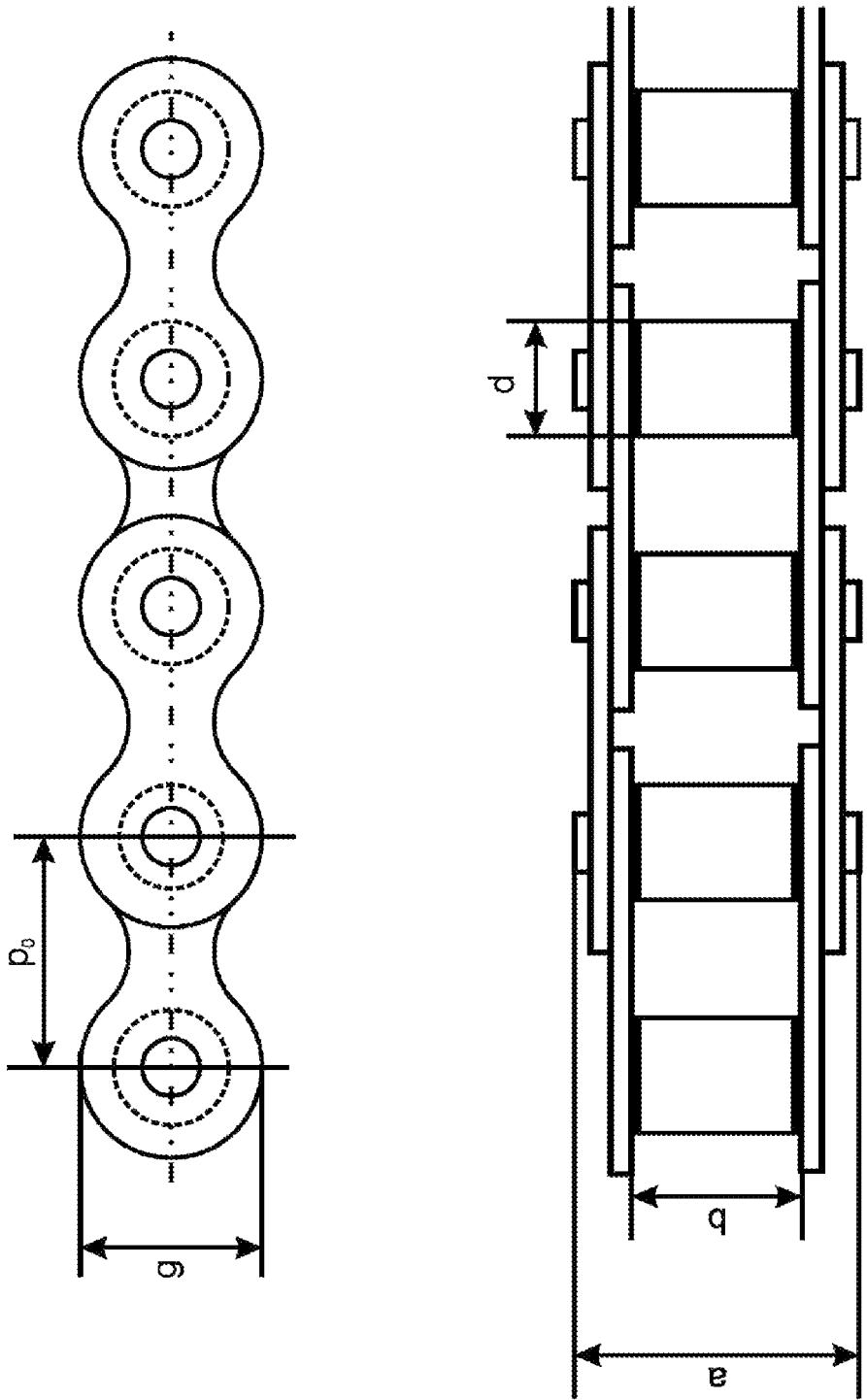
FIG. 7 shows the dimensions of a standardized chain according to the NASI Standard or the British Standard

An exemplary, incomplete listing with the dimensions according to FIG. 7 of different one-piece roller chains according to ANSI Standard of the American type (DIN 8187) or according to British Standard (BS, DIN 8188) is shown in the following table. Method 1 according to the invention can be used for all of these chain types. However, the second part 420 of the calibration object 400 must be selected accordingly for each chain type according to the pitch p0 and the diameter d of the chain bushings 130.

| Pitch × inner width | | DIN ISO number | Pitch $p_0$ (mm) | Inside b (mm) | Outside a (mm) | Roller diameter d (mm) | Plate height g (mm) | Joint area f (cm²) | Weight q kg/m |
|---|---|---|---|---|---|---|---|---|---|
| ½ × 5/16" | | 08B-1 | 12.7 | 7.75 | 16.9 | 8.51 | 12.2 | 0.5 | 0.7 |
| ½ × 8/16" | ANSI 40 | 08A-1 | 12.7 | 7.94 | 16.6 | 7.95 | 12 | 0.44 | 0.6 |
| ⅝ × ⅜" | | 10B-1 | 15.875 | 9.65 | 19.5 | 10.16 | 14.4 | 0.67 | 0.95 |
| ⅝ × ⅜" | ANSI 50 | 10A-1 | 15.875 | 9.53 | 20.4 | 10.16 | 14.4 | 0.7 | 1 |
| ¾ × 7/16" | | 12B-1 | 19.05 | 11.75 | 22.7 | 12.07 | 16.4 | 0.89 | 1.25 |
| ¾ × ½" | ANSI 60 | 12A-1 | 19.05 | 12.7 | 25.3 | 11.91 | 18 | 1.06 | 1.47 |
| 1" × 17 mm | | 16B-1 | 25.4 | 17.02 | 36.1 | 15.88 | 21.1 | 2.1 | 2.7 |
| 1 × ⅝" | ANSI 80 | 16A-1 | 25.4 | 15.88 | 32.1 | 15.88 | 22.8 | 1.79 | 2.57 |

British Standard—DIN 8187;
ANSI Standard—DIN 8188
Min. and max. dimensions for the chains are specified in the respective standards.

The table above shows concrete nominal dimensions as an example

Figure 4:
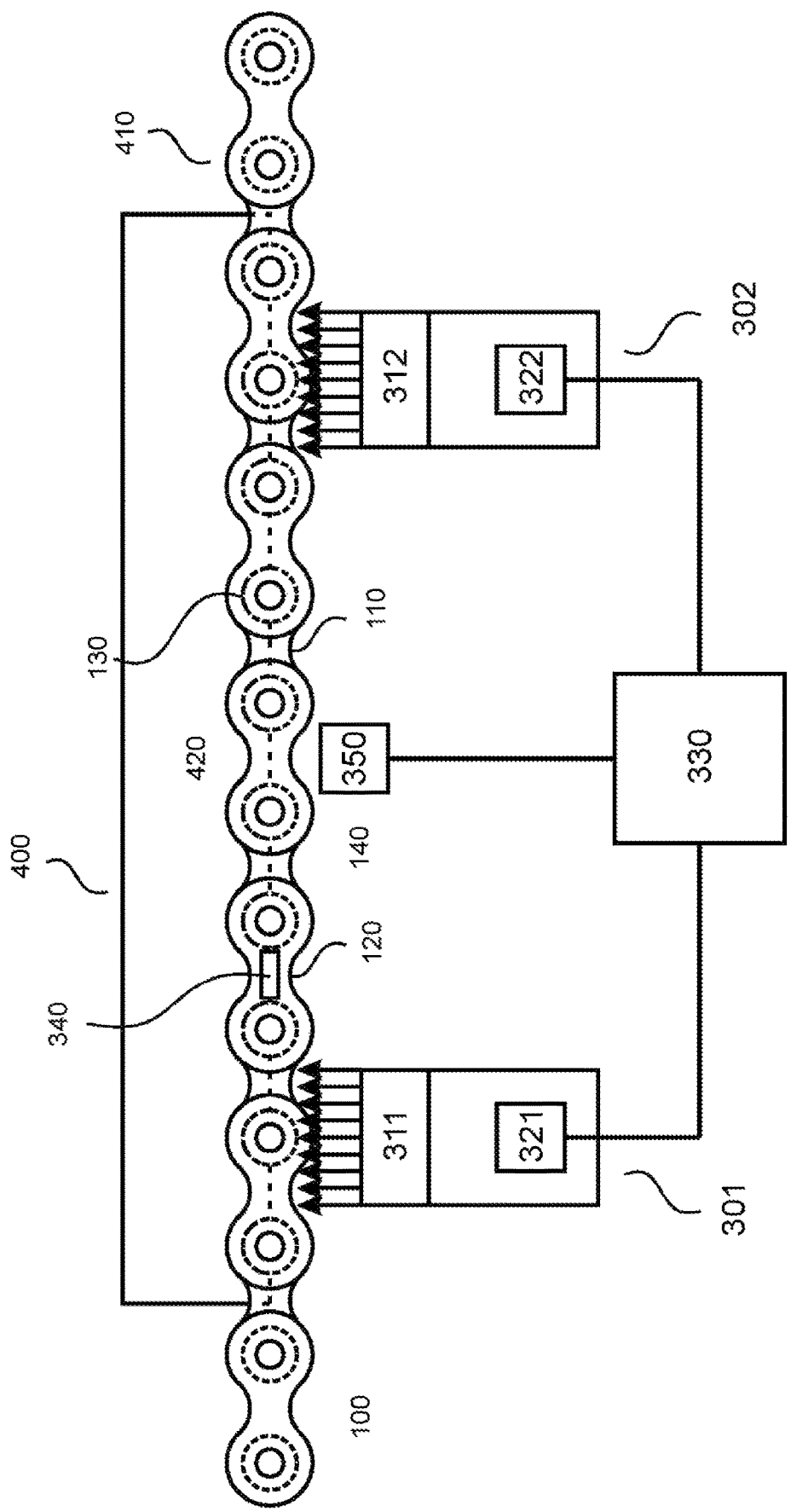
FIG. 4 shows another embodiment of the sensor device according to the invention with a common decentralized control

FIG. 4 shows a further exemplary embodiment of setting up a sensor device 300 according to the invention for determining the elongation of segments of a chain 100. The sensor device 300 has two sensor systems 301, 302 connected by an evaluation circuit 330. The sensor systems 301, 302 are positioned using method 1 according to the invention such that when the chain 100 is new, the distance D between the sensor systems 301, 302 corresponds exactly to an integer multiple of the distances p0 between two adjacent chain pins 140 of the chain 100 to be monitored.

The sensor systems 301, 302 can be designed as inductively operating differential transformers, with which the position of chain components is determined. Such sensor systems 301, 302 detect chain components—in this exemplary embodiment the chain bushings 140—over a length range of the sensors 311, 312.

The symmetry of the sensors 311, 312 is disturbed by the passage of the chain component 140. The asymmetry created by the chain component 140 is greatest when the chain component 140 is arranged in the region of the sensors 311, 312 at the edges of the sensors 311, 312, i.e. is moved out of or into the sensor region. The sensors 311, 312 then generate a maximum output voltage U when the chain component 130 is positioned at the edge of the sensors 311, 312. The asymmetry and the resulting output voltage generated by the sensors 311, 312 is U=0 when the chain component 140 is positioned in the middle of the sensors 311, 312. The length value is determined via the pitch (distance between two adjacent chain links of the chain). The length value, like the distance between the chain components, is continuously and simultaneously determined.

The sensor system 301 generates the positions via the trigonometric functions Asin and Acos, the sensor system 302 generates the positions via the trigonometric functions Bsin and Bcos. The elongation $\Delta L$ of the chain 100 then results from the position differences, which are calculated from the two sensor systems 301, 302:

$$\Delta L/L0 = (\arctan(Bsin/Bcos) - \arctan(Asin/Acos))/D$$

However, the sensor systems 301, 302 can also be optical or magnetic sensors or a combination of the types of sensors mentioned. The sensor systems 301, 302 are each connected to an evaluation circuit 330. The controls 321, 322 supply the detected measured values to an evaluation circuit 330, in which the analog measured values are converted into digital values and stored on the microcontroller. In this exemplary embodiment, a permanent magnet 340 is arranged on chain 100, the position of which is detected by means of a Hall sensor 350 and the evaluation circuits 330. The microcontroller of the evaluation circuit 330, which is connected to the Hall sensor 350, registers the position of the permanent magnet 340 and enables the individual chain links to be identified by continuously counting the passages of the permanent magnet 340 on the sensor systems 301, 302.

Figure 5:
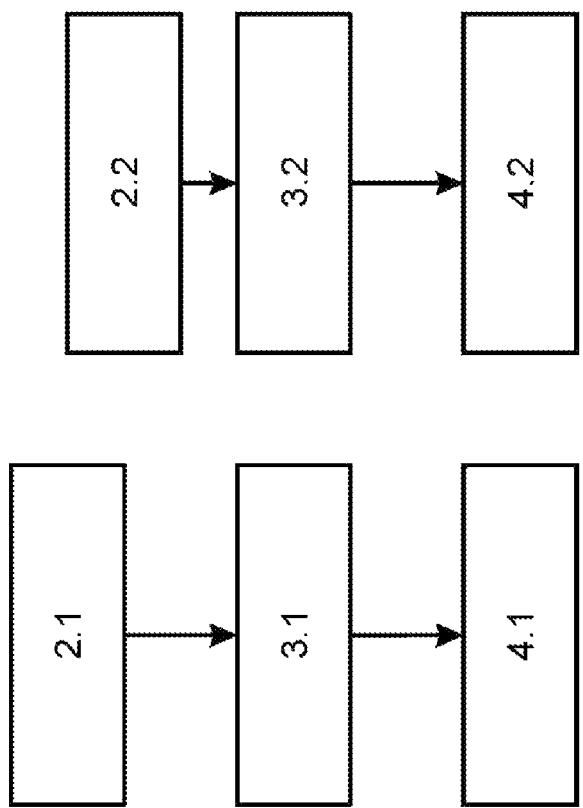
FIG. 5 shows the method according to the invention

An exemplary embodiment of method 1 according to the invention for setting up two sensor systems for monitoring the state of wear of a chain 100 is shown in FIG. 5. For this purpose, a first positioning 2.1 of the first sensor system 201 as well as a first positioning 2.2 of the second sensor system 202 relative to the calibration object 300 are performed. A first signal detection 3.1 is then carried out using the first sensor system 201, and at the same time a first signal detection 3.2 is carried out using the second sensor system 202. This is followed by a separate evaluation 4.1, 4.2 for each sensor system 201, 202 of the measured values determined by the first sensor system 201 and second sensor system 202 with regard to whether the two sensor systems 201, 202 simultaneously detect a chain component 130. The method 1 according to the invention provides a reproducible distance D between the sensor systems 201, 202. In this context is important at which position in the sensor region the chain components 130 are located—this is how the sensor learns the correct distances p0 and compensates for the individual production-related deviations. The method 1 according to the invention is advantageously carried out several times in succession in order to detect and compensate for any fault states due to different chain geometries over the chain length and due to mechanical and metrological tolerances.

Figure 6:
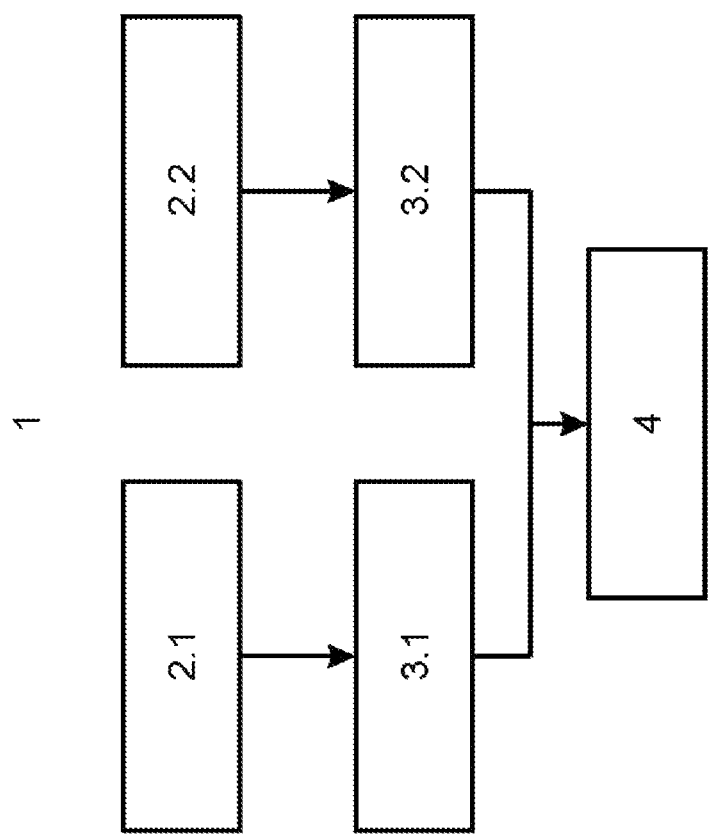
FIG. 6 shows another example of the method according to the invention

FIG. 6 shows a variant of the method 1 according to the invention for setting up two sensor systems for monitoring the state of wear of a chain 100. For this purpose, a first positioning 2.1 of the first sensor system 201 and a first positioning 2.2 of the second sensor system 202 in relation to the calibration object 400 are performed. A first signal detection 3.1 is then carried out using the first sensor system 201, and at the same time a first signal detection 3.2 is carried out using the second sensor system 202. This is followed by an evaluation 4 of the measured values determined by the first sensor system 201 and second sensor system with regard to whether the two sensor systems 201, 202 simultaneously detect a chain component 130. Method 1 is also carried out several times.

LIST OF REFERENCE NUMERALS 1 method for setting up two sensor systems to monitor the state of wear of a chain
2.1 first positioning of the first sensor system
2.2 first positioning of the second sensor system
3.1 first signal detection using the first sensor system
3.2 first signal detection using the second sensor system
4, 4.1, 4.2 evaluation
100 chain
110 chain inner link
120 chain outer link
130 chain bushing
140 chain pin
200 sensor device
201 first sensor system
202 second sensor system
211, 212 sensor
221, 222 control
300 sensor device
301 first sensor system
302 second sensor system
311, 312 sensor
321, 322 control
330 evaluation circuit
340 permanent magnet
350 Hall sensor
400 calibration object
410 first part of the calibration object/chain
420 second part of the calibration object/measuring template
421 recess
422 serration
d roller diameter
p0 pitch (distance between two adjacent chain pins) in new condition
p pitch (distance between two adjacent chain pins) in actual condition L0 length of chain between first and second sensor system, new condition
L length of chain between first and second sensor system, actual condition
ΔL elongation of the chain
D distance from 1st sensor system to 2nd sensor system

We claim:

1. A method for setting up two sensor systems for monitoring the state of wear of a chain, the method comprising:
   first positioning of the first sensor system relative to a calibration object
   first positioning of the second sensor system relative to the calibration object
   detecting a first position of a first chain component with a first sensor, and
   detecting a first position of a second chain component with a second sensor, wherein a chain is part of the calibration object,
   wherein of the first position of the first chain component and the first position of the second chain component are detected simultaneously,
   wherein the calibration object is designed in two parts, and
   wherein the second part of the calibration object is an element with the aid of which chain components can be positioned in relation to one another.

2. The method of claim 1, wherein the first positioning of the first sensor system and the first positioning of the second sensor system take place at the same time.

3. The method of claim 1, wherein a second positioning of the first and/or the second sensor system relative to the calibration object takes place, the second positioning being different from the first positioning, and/or a second signal detection takes place with the first and/or second sensor system.

4. The method of claim 3, wherein the second positioning of the first and the second sensor system and/or the second signal detection by the first and the second sensor system takes place at the same time.

5. The method of claim 1, wherein the first part of the calibration object is a chain.

6. The method of claim 1, wherein the method (1) for setting up two sensor systems for monitoring the state of wear of a chain takes place depending on the chain type for which the sensor should be used.

7. The method of claim 6, wherein the chain type is a standard chain.

8. The method of claim 6, wherein the chain type is a standard chain according to British Standard or ANSI Standard.

9. The method of claim 1, wherein the method for setting up two sensor systems for monitoring the state of wear of a chain takes place depending on the chain type for which the sensor should be used.

10. The method of claim 9, wherein the pitch of the chain corresponds to 12.700 mm, 15.875 mm, 19.050 mm, 25.400 mm, 31.750 mm, 38.100 mm, 44.450 mm or 50.800 mm.

11. The method of claim 1, wherein the first sensor system and/or the second sensor system are suitable for detecting the position of a chain component.

12. The method of claim 11, wherein the first and/or the second sensor system are suitable for detecting the signals of a chain component to determine the position of the chain component over a path length range of the chain, for which the sensor system is provided.

13. The method of claim 12, wherein the path length range is greater than or equal to ½ the pitch of the chain, preferably greater than or equal to ¾ the pitch of the chain and more preferably greater than or equal to the pitch of the chain for which the sensor system is provided.

14. A sensor device for determining states of wear of a chain (100) with a first sensor system for detecting a first position of a first chain component and a second sensor system, for detecting a first position of a second chain component, wherein the first position of the first chain component and the first position of the second chain component are detected simultaneously, wherein the calibration object is designed in two parts, and wherein the second part of the calibration object is an element with the aid of which chain components can be positioned in relation to one another.

15. The sensor device of claim 14, wherein the chain type is a standard chain according to British Standard or ANSI Standard.

16. The sensor device of claim 14, wherein the pitch of the chain corresponds to 12.700 mm, 15.875 mm, 19.050 mm, 25.400 mm, 31.750 mm, 38.100 mm, 44.450 mm or 50.800 mm.

17. The sensor device of claim 14, wherein the first sensor system is suitable for determining the position of a first chain component exclusively from the measured values detected by the first sensor system and/or the second sensor system is suitable for determining the position of a second chain component exclusively from the values measured by the second sensor system.

18. The sensor device of claim 17, wherein the sensor device is suitable for simultaneously detecting the measured values for determining the position of the first chain component and the position of the second chain component.

19. The sensor device of claim 14, wherein the first sensor and/or the second sensor are suitable for detecting the measured values for determining the position of the first or second chain component over a path length range of the chain.

20. The sensor device of claim 14, wherein the path length range is greater than or equal to ½ segment length.

21. The sensor device of claim 14, wherein the segment length corresponds to the distance between the first chain component and the directly adjacent second chain component.

* * * * *